United States Patent [19]

Wallon et al.

[11] Patent Number: 5,231,130
[45] Date of Patent: Jul. 27, 1993

[54] AQUEOUS POLYURETHANE DISPERSIONS

[75] Inventors: Alexander Wallon, Hassloch; Lothar Maempel, Bruehl; Horst Seibert, Fussgoenheim; Ruediger Fuessl, Neustadt, all of Fed. Rep. of Germany

[73] Assignee: BASF Aktiengesellschaft, Ludwigshafen, Fed. Rep. of Germany

[21] Appl. No.: 974,492

[22] Filed: Nov. 12, 1992

[30] Foreign Application Priority Data

Nov. 15, 1991 [DE] Fed. Rep. of Germany ....... 4137556

[51] Int. Cl.⁵ .............................. C08G 18/54
[52] U.S. Cl. .................... 524/500; 524/501; 524/541; 524/839; 524/840
[58] Field of Search ............... 524/500, 501, 541, 839, 524/840

[56] References Cited

U.S. PATENT DOCUMENTS 4,954,553  9/1990  Johnson et al. ............... 524/501

FOREIGN PATENT DOCUMENTS 3903538  8/1990  Fed. Rep. of Germany.
4024567  2/1992  Fed. Rep. of Germany.

Primary Examiner—Maurice J. Welsh
Attorney, Agent, or Firm—Oblon, Spivak, McClelland, Maier & Neustadt

[57] ABSTRACT

Aqueous dispersions contain
A) from 96.95 to 45% by weight of a polyurethane,
B) from 3.0 to 50% by weight of a phenol/formaldehyde condensation resin or of an epoxy resin and
C) from 0.05 to 5.0% by weight of an inorganic salt having a solubility of less than 1 g/l in water at 20° C., the percentages by weight being based on the sum of the components A), B) and C).

3 Claims, No Drawings

AQUEOUS POLYURETHANE DISPERSIONS

The present invention relates to aqueous dispersions containing
- A) from 96.95 to 45% by weight of a polyurethane,
- B) from 3.0 to 50% by weight of a phenol/formaldehyde condensation resin or of an epoxy resin and
- C) from 0.05 to 5.0% by weight of an inorganic compound having a solubility of less than 1 g/l of solution in water at 20° C., the percentages by weight being based on the sum of the components A), B) and C).

German Patent Application 40 24 567 and DE-A 39 03 538 disclose dispersions which contain a polyurethane and a phenol/formaldehyde resin or epoxy resin. Owing to good initial adhesive strength, the dispersions are particularly suitable as contact adhesives. The heat distortion resistance, i.e. the load capacity of adhesive bonds at elevated temperatures, is particularly important for many applications.

It is an object of the present invention to provide aqueous dispersions which have in particularly very good heat distortion resistance when used as an adhesive.

We have found that this object is achieved by the aqueous dispersions defined at the outset.

The novel dispersion contains from 96.95 to 45.0, preferably from 94.8 to 62, very particularly preferably from 94 to 68, % by weight, based on the sum of the components A), B) and C), of a polyurethane A).

The polyurethane is essentially, preferably exclusively, composed of the components (a) to (e). The functional groups which are reactive toward isocyanate are hydroxyl or primary or secondary amino.

Particularly suitable organic polyisocyanates (a) are aliphatic, cycloaliphatic and aromatic diisocyanates. Those of the general formula X(NCO)$_2$, where X is an aliphatic hydrocarbon radical of 4 to 12 carbon atoms, a cycloaliphatic hydrocarbon radical of 6 to 15 carbon atoms or an aromatic hydrocarbon radical of 6 to 15 carbon atoms, are preferably used.

Suitable aliphatic, cycloaliphatic and aromatic diisocyanates are, for example, butane 1,4-diisocyanate, hexane 1,6-diisocyanate, 2,2,4- and 2,4,4-trimethylhexamethylene diisocyanate, cyclohexane diisocyanate, methylcyclohexane diisocyanate, isophorone diisocyanate, 4,4'-diisocyanatodiphenylmethane, 4,4'-diisocyanatodicyclohexylmethane and 2,4- and 2,6-toluylene diisocyanate.

Mixtures of the diisocyanates may also be used. Mixtures of aliphatic or cycloaliphatic diisocyanates with aromatic diisocyanates in a molar ratio of from 1:4 to 5:1 have proven particularly suitable.

In addition to the diisocyanates, it is also possible to use minor amounts of monoisocyanates for molecular weight regulation. When isocyanates having a higher functionality, for example tri- or tetraisocyanates, are present, branched structures are obtained.

Suitable polyhydroxy compounds (b) having a molecular weight of from over 500 to 6,000 are in particular polyesters, polyethers, polythioethers, polylactones, polyacetals, polycarbonates or polyesteramides having at least 2 hydroxyl groups. Dihydroxy compounds, in particular those having a molecular weight of from 750 to 3,000, are preferrred. It is of course also possible to use mixtures of these dihydroxy compounds.

Preferably, the polyurethanes are self-dispersible in water as a result of containing components c) or d). The addition of emulsifiers or dispersants can then be dispensed with. Preferably, the polyurethane is water-dispersible as a result of containing only c).

Components c) are compounds having at least one group which is reactive toward isocyanate and at least one group which is ionic or can be converted into an ionic group.

Examples of suitable components (c) are aliphatic, cycloaliphatic or aromatic mono- or dihydroxycarboxylic acids. Dihydroxyalkanecarboxylic acids are preferred, in particular those of 3 to 10 carbon atoms, as also described in U.S. Pat. No. 3,412,054. Compounds of the general formula

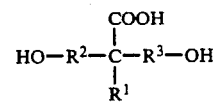

where $R^1$ is hydrogen or alkyl of 1 to 4 carbon atoms and $R^2$ and $R^3$ are each $C_1$–$C_4$-alkylene, are particularly preferred. An example is 2,2-dimethylolpropionic acid.

Tertiary ammonium salts containing one or two hydroxyl or amino groups, and aminocarboxylic acids or aminosulfonic acids, e.g., lysine, β-alanine, N-(2-aminoethyl)-2-aminoethanesulfonic acid and the adducts, stated in DE-A-20 34 479, of aliphatic diprimary diamines with α-olefinic carboxylic acids, for example the adduct of ethylenediamine with acrylic acid, are also noteworthy.

Component (c) contains ionic groups or groups which can be converted into ionic groups, in order to ensure that the polyurethane is dispersible in water. For this purpose, its amount is usually from 0.03 to 0.5, preferably from 0.05 to 0.4, gram equivalent, based on 1 mol of isocyanate groups.

To convert potential anionic groups, for example carboxylic acid groups or sulfonic acid groups, into ionic groups, inorganic and/or organic bases, such as sodium hydroxide, potassium hydroxide, potassium carbonate, sodium bicarbonate, ammonia or primary, secondary and in particular tertiary amines, e.g., triethylamine or dimethylaminopropanol, may be used.

Suitable neutralizing agents for converting the potential cationic groups, e.g., tertiary amino, into the corresponding cations, e.g. ammonium, are inorganic or organic acids, e.g., hydrochloric acid, acetic acid, fumaric acid, maleic acid, lactic acid, tartaric acid, oxalic acid or phosphoric acid, and suitable quaternizing agents for this purpose are, for example, methyl chloride, methyl iodide, dimethyl sulfate, benzyl chloride, ethyl chloroacetate or bromoacetamide. Further suitable neutralizing or quaternizing agents are described in, for example, U.S. Pat. No. 3,479,310, column 6.

The neutralization or quaternization of the ionic or of the potentially ionic groups can be carried out before, during or, in particular, after the isocyanate polyaddition reaction.

The components (d) which may or may not be used are nonionic emulsifiers having at least one group which is reactive toward isocyanate. They do not contain any group which is ionic or can be converted into an ionic group. Monohydric polyether alcohols having a molecular weight of from 500 to 10,000, preferably from 1,000 to 5,000, g/mol are preferred. Monohydric polyether alcohols are obtainable by alkoxylating monohydric initiator molecules, for example methanol, ethanol or n-butanol, ethylene oxide or a mixture of ethylene oxide with other alkylene oxides, in particular propylene oxide, being used as the alkoxylating agent. Where alkylene oxide mixtures are used, however, they preferably contain at least 40, preferably at least 65, mol % of ethylene oxide.

Components (e) are compounds which differ from c) and d) and have at least two groups which are reactive toward isocyanate and a molecular weight of from 60 to 500 g/mol. They are essentially compounds which contain two hydroxyl or two amino groups or one hydroxyl and one amino group. For example, dihydroxy compounds, such as 1,3-propanediol or 1,4-butanediol, diamines, such as ethylenediamine, hexamethylenediamine, piperazine, 2,5-dimethylpiperazine, 1-amino-3-aminomethyl-3,5,5-trimethylcyclohexane (isophoronediamine), 4,4'-diaminodicyclohexylmethane, 2,4-diaminocyclohexane, 1,2-diaminopropane or hydrazine, or amino alcohols, such as ethanolamine, isopropanolamine, methylethanolamine or aminoethoxyethanol, are suitable. The presence of component e) having a higher functionality results in branches in the polyurethane, by means of which the heat distortion resistance can be even further increased.

The amounts of components a) to e) are chosen in particular so that the sum of the hydroxyl or amino groups which are reactive toward isocyanate is from 0.9 to 1.1, preferably from 0.95 to 1.05, gram equivalents per gram equivalent of isocyanate.

The number of functional groups which are reactive toward isocyanate is particularly preferably roughly the same as the number of isocyanate groups.

The amount of the individual components, based on 1 gram equivalent of isocyanate, is in particular 0.1–0.8, preferably 0.2–0.8, gram equivalent of components (b)

0–0.4, preferably 0.05–0.4, gram equivalent of components (c)

0–0.4, preferably 0–0.3, gram equivalent of components (d)

0–0.8, preferably 0.1–0.6, gram equivalent of components (e).

For the preparation of the polyurethane, the components (a) to (e) in a low-boiling, water-miscible organic solvent can be reacted in a known manner, as also described, for example, in DE-A-34 37 918.

Examples of preferred solvents are tetrahydrofuran, methyl ethyl ketone, N-methylpyrrolidone and in particular acetone.

The reaction temperature is preferably from 50° to 100° C.

Conventional and known catalysts, such as dibutylin dilaurate, tin(II) octoate or 1,4-diazabicyclo[2.2.2]octane, may be present for accelerating the reaction of the diisocyanates.

The polyurethane obtained is then dispersed in water and the organic solvent is removed to the required extent, in general completely, by distillation.

The polyurethane can also be prepared by first preparing a polyurethane prepolymer in the low-boiling water-miscible organic solvent. In particular, at least the components (a) and (b) and parts of c) are reacted with one another for this purpose. The polyurethane prepolymer obtained is then dispersed in water. The further reaction with other components can then be carried out. The organic solvent can then be removed, as described above.

The novel dispersion furthermore contains from 3.0 to 50, in particular from 5.0 to 35, very particularly preferably from 5 to 30, % by weight of a phenol/formaldehyde condensation resin or of an epoxy resin B). The former is preferred.

The phenol/formaldehyde condensation resin is in particular one having a weight average molecular weight ($\overline{M}_w$) of from 500 to 2,000 and a softening temperature (determined according to DIN 53,736) of from 80° to 130° C.

The phenol/formaldehyde condensation resins are particularly preferably novolaks, as obtainable by acid-catalyzed reaction of phenols, in particular phenol, with formaldehyde. In particular, from 1.05 to 1.3 mol of phenols are used per mol of formaldehyde.

Epoxy resins, preferably reaction products of epoxides, e.g., epichlorohydrin, with bisphenol A, are also particularly suitable; those having weight average molecular weights ($\overline{M}_w$) of from 500 to 5,000 and softening temperatures of from 80° to 130° C. are preferred.

The aqueous dispersion contains, as component C), from 0.05 to 5.0, preferably from 0.2 to 3.0, particularly preferably from 1 to 2, % by weight of at least one inorganic compound which is sparingly soluble in water and has a solubility of less than 1.0, preferably less than 0.5, g/l of solution at 20° C. in water. Preferably, however, the solubility should be greater than 0.1 mg/l of solution at 20° C.

Suitable inorganic compounds are the sulfides, arsenides, tellurides, selenides, sulfo salts, oxides, hydroxides, carbonates, phosphates, molybdates, sulfates, borates, halides, stannates and silicates of the metals of main groups II–V and of the transition elements. Particularly preferred here are the metal oxides, in particular of divalent metals, for example zinc oxide and particularly preferably magnesium oxide. The corresponding metal salts of the organic carboxylic, sulfonic and phosphonic acids, in particular the alkaline earth metal salts of oxalic acid, may also be used, calcium oxalate being particularly preferred.

The compounds should advantageously be present in a finely divided form having a median particle diameter ($d_{50}$ value, weight average) of from 500 µm to 50 nm, preferably from 250 µm to 50 nm.

The solids content of the novel dispersions is preferably from 10 to 70, particularly preferably from 20 to 50, % by weight.

The novel dispersion can be prepared, for example, by mixing an aqueous polyurethane dispersion, or an aqueous dispersion or solution of a phenol/formaldehyde condensation resin or of an epoxy resin and of the inorganic salt. If necessary, emulsifiers and dispersants may be added.

The inorganic compounds may be added, for example in solid form, in principle at any time before, during or after the preparation of the polyurethane dispersion. However, the embodiment in which they are added in the form of an aqueous suspension which contains 5–30% by weight of solids to the prepared polyurethane dispersion is preferred. In particular, the inorganic compound can be added in the form of a dispersion. It is prepared by emulsifying the salt in water using high shearing forces and in the presence of an emulsifier, for example polyacrylic acids having a molecular weight ($M_n$) of 100–4,000 or the Na salts thereof, maleic anhydride/methyl vinyl ether copolymers having an $M_n$ of 10,000–70,000 or maleic acid/olefin copolymers having an $M_n$ of 8,000–12,000 or the Na salts thereof.

The polyurethane dispersions are preferably prepared by a method in which the phenol/formaldehyde resin or epoxy resin is added to the polyurethane dispersion or to the dispersion of a polyurethane prepolymer prior to dispersing in water. In the case of the prepolymer, the further reaction to give the polyurethane is then carried out in water. This gives stable aqueous dispersions in which the added phenol/formaldehyde condensation resin or epoxy resin is present, presumably in the interior of the dispersion particles, and is surrounded by a stabilizing polyurethane layer. This method of preparation is described, for example, in DE-A-39 03 538.

The novel dispersions are particularly suitable for use as contact adhesives, for example for the adhesive bonding of wood, plastic, glass or metal. Further additives, such as plasticizers, film formation assistants, fillers, etc., may be added to the dispersions in order to achieve specific properties. In the case of contact bonding, the surfaces of the two substrates to be bonded are advantageously coated with the dispersion.

The resulting adhesive bonds have not only good initial adhesive strength but in particular very good heat distortion resistance.

EXAMPLES

Abbreviations

TDI: Toluylene diisocyanate
HDI: Hexamethylene diisocyanate
DBT: Dibutyltin dilaurate
PUD salt: Na salt of the Michael adduct of acrylic acid and ethylenediamine
DMPA: Dimethylolpropionic acid

COMPARATIVE EXAMPLE 1

The TDI was added at 60° C. to a mixture of a dehydrated polyesterol, prepared from adipic acid, acetone I and catalyst. The HDI was added after a reaction time of one hour at 65° C., and the acetone II was introduced after a reaction time of a further two hours at 70° C., after which the reaction mixture had an NCO content of 0.7% by weight.

The chain extension was effected at 50° C. with PUD salt, which was present as a 40% strength solution in water. The resin solution, prepared from acetone III and a phenol/formaldehyde condensate, was added after 5 minutes, and stirring was carried out for 5 minutes at 50° C. Thereafter, dispersing as effected with water and the acetone was distilled off.

The resulting finely divided dispersion had a solids content of 41% by weight.

|  | Molar amount [mmol] | Parts by weight [g] |
| --- | --- | --- |
| Polyesterdiol (OH number = 46.5) | 202 | 488 |
| TDI | 147 | 25.6 |
| HDI | 147 | 24.7 |
| DBTL |  | 0.1 |
| Acetone I |  | 132 |
| Acetone II |  | 526 |
| PUD salt (40% strength) | 93 | 40.5 |
| Phenol/formaldehyde condensate, $M_w$ = about 600–1200, softening temperature 90–110° C. |  | 240 |
| Acetone III |  | 240 |
| Demineralised water |  | 1200 |

COMPARATIVE EXAMPLE 2

The TDI was added to a mixture of dehydrated polytetrahydrofuran, DMPA, 1,4-dihydroxybutane, trimethylolpropane, acetone I and catalyst. The HDI was added after a reaction time of one hour at 65° C., and the reaction was continued for a further 90 minutes. After the addition of acetone II, the reaction mixture has an NCO content of 0.60% by weight.

The chain extension was effected at 50° C. with the PUD salt, which was present as a 40% strength solution in water. The resin solution, prepared from acetone III and a phenol/formaldehyde condensate, was added after 5 minutes, and stirring was carried out for 5 minutes at 50° C. Thereafter, dispersing was effected with water and the acetone was distilled off.

The resulting finely divided dispersion had a solids content of 41% by weight.

|  | Molar amount [mmol] | Parts by weight [g] |
| --- | --- | --- |
| Polytetrahydrofuran (OH number = 55.9) | 178 | 357 |
| DMPA | 28 | 3.8 |
| 1,4-Dihydroxybutane | 516 | 46.5 |
| TDI | 402 | 70.1 |
| HDI | 408 | 68.7 |
| DBTL |  | 0.1 |
| Acetone I |  | 133 |
| Acetone II |  | 533 |
| PUD salt (40% strength) | 66 | 28.7 |
| Phenol/formaldehyde condensate, $M_w$ = about 600–1200, softening temperature 90–110° C. |  | 240 |
| Acetone III |  | 240 |
| Demineralised water |  | 1200 |

COMPARATIVE EXAMPLE 3

The TDI was added at 60° C. to a mixture of dehydrated polyesterol, prepared from adipic acid and butanediol, DMPA, trimethylolpropane, acetone I and catalyst. The HDI was added after a reaction time of one hour at 65° C., and the acetone II was introduced after a reaction time of a further two hours at 70° C., after which the reaction mixture had an NCO content of 0.56% by weight.

The chain extension was effected at 50° C. with the PUD salt, which was present as a 40% strength solution in water. The resin solution, prepared from acetone III and a phenol/formaldehyde condensate, was added after 5 minutes, and stirring was carried out for 5 minutes at 50° C. Thereafter, dispersing was effected with water and the acetone was distilled off.

The resulting finely divided dispersion had a solids content of 41% by weight.

|  | Molar amount [mmol] | Parts by weight [g] |
| --- | --- | --- |
| Polyesterdiol (OH number = 45.2) | 194 | 481 |
| DMPA | 28 | 3.8 |

| | Molar amount [mmol] | Parts by weight [g] |
| --- | --- | --- |
| Trimethylolpropane | 32 | 4.3 |
| TDI | 172 | 29.7 |
| HDI | 173 | 29.1 |
| DBTL | | 0.1 |
| Acetone I | | 133 |
| Acetone II | | 533 |
| PUD salt (40% strength) | 66 | 28.7 |
| Phenol formaldehyde condensate, $M_w$ = about 600–1200, softening temperature 90–110° C. | | 240 |
| Acetone III | | 240 |
| Demineralised water | | 1200 |

COMPARATIVE EXAMPLE 4

The TDI was added to a mixture of dehydrated polyesterol, prepared from adipic acid and 1,4-butanediol, 1,4-butanediol, acetone I and catalyst. The HDI was added after a reaction time of one hour at 65° C., and the reaction was continued for a further 90 minutes. After the addition of acetone II, the reaction mixture had an NCO content of 0.75% by weight.

The chain extension was effected at 50° C. with the PUD salt, which was present as a 40% strength solution in water. The resin solution, prepared from acetone III and a condensate of bisphenol A and epichlorohydrin, was added after 5 minutes, and stirring was carried out for 5 minutes at 50° C. Thereafter, dispersing was effected with water and the acetone was distilled off.

| | Molar amount [mmol] | Parts by weight [g] |
| --- | --- | --- |
| Polyesterdiol ADS/B14 (OH number: 45.0) | 191 | 476 |
| 1,4-Butanediol | 72 | 6.5 |
| TDI | 178 | 31.0 |
| HDI | 178 | 30.0 |
| DBTL | | 0.1 |
| Acetone I | | 133 |
| PUD salt (40% strength) | 94 | 16.4 |
| Acetone II | | 532 |
| Epikote 1007 (condensation resin of bisphenol A and epichlorohydrin, $M_w$ about 1550–2000) | | 240 |
| Acetone III | | 240 |
| Demineralised water | | 1200 |

EXAMPLES 1–4

A 10% strength by weight suspension of MgO in water was added to the particular dispersions of Comparative Examples 1–4 shortly before the testing of the performance characteristics, so that the dispersions contained 1% by weight, based on the solids content of the dispersion, of MgO.

Testing the Content Adhesion at Room Temperature

Shear strength:

The dispersions were thickened with 5% by weight, based on their solids content, of pyrogenic silica. The mixture was applied by means of a knife coater having 1 mm teeth to beechwood panels over an area of 150×50 mm² and was dried for 60 minutes at room temperature. These test specimens were then adhesively bonded by pressing them at 0.5N/mm² for 30 seconds at room temperature. The shear strength was determined immediately and after storage for 7 days at room temperature, in terms of the force in N/mm² which was required to pull off the bonded beechwood panels in the longitudinal direction of the panels. Heat distortion resistance:

Hardboard was adhesively bonded to a PVC film over an area of 200×200 mm² (contact adhesion at room temperature). The PVC film was loaded with 300 g at a peel angle of 180°. The temperature was increased by 10° C. every 30 minutes. The distance covered within these 30 minutes is stated in mm.

| | Adhesion values | |
| --- | --- | --- |
| | Shear strength Immediately/7 days [N/mm²] | Heat distortion resistance [°C./mm] |
| Comparative Example 1 | 1.3/4.4 | 40/0, 50/0, 60/1, 70/4 80/complete distance |
| Comparative Example 2 | 1.1/2.1 | 40/0, 50/0, 60/0, 70/1 80/1, 90/5, 100/complete distance |
| Comparative Example 3 | 1.6/4.9 | 40/0, 50/0, 60/1, 70/1 80/2, 90/2, 100/8, 110/complete distance |
| Comparative Example 43 | 1.4/2.5 | 40/0, 50/1, 60/complete distance |
| Example 1 | 1.4/4.5 | 40/0, 50/0, 60/0, 70/1, 80/1, 90/1, 100/2, 110/complete distance |
| Example 2 | 1.1/2.0 | 40/0, 50/0, 60/0, 70/0, 80/0, 90/1, 100/1, 110/2, 120/complete distance |
| Example 3 | 1.4/4.7 | 40/0, 50/0, 60/0, 70/1, 80/1, 90/1, 100/2, 110/3, 120/complete distance |

We claim:

1. An aqueous dispersion containing
   A) from 45 to 96.95% by weight of a polyurethane,
   B) from 3.0 to 50% by weight of a phenol/formaldehyde condensation resin or of an epoxy resin and
   C) from 0.05 to 5.0% by weight of an inorganic compound having a solubility of less than 1 g/l of solution in water at 20° C.,
   the percentages by weight being based on the sum of the components A), B) and C).

2. An aqueous dispersion as claimed in claim 1, containing
   A) from 96.95 to 45% by weight of a polyurethane which is essentially composed of
      (a) organic polyisocyanates,
      (b) polyhydroxy compounds which have a molecular weight of from over 500 to 6,000 g/mol and contain no groups which are ionic or can be converted into ionic groups,
      (c) if required, compounds having at least one group which is reactive toward isocyanate and at least one group which is ionic or can be converted into an ionic group,
      (d) if required, nonionic emulsifiers having at least one group which is reactive toward isocyanate and
      (e) if required, compounds which differ from (c) and (d) and have at least two groups which are reactive toward isocyanate and a molecular weight of from 60 to 500 g/mol,
   B) from 3.0 to 50% by weight of a phenol/formaldehyde condensation resin or of an epoxy resin and C) from 0.05 to 5.0% by weight of an inorganic compound having a solubility of less than 1 g/l of solution in water at 20° C., the percentages by weight being based on the sum of the components A), B) and C).

3. An adhesive coating obtainable using a dispersion as claimed in claim 1.

* * * * *